(12) United States Patent
Zheng et al.

(10) Patent No.: US 8,464,221 B2
(45) Date of Patent: Jun. 11, 2013

(54) VISUALIZATION TOOL FOR SYSTEM TRACING INFRASTRUCTURE EVENTS

(75) Inventors: Alice X. Zheng, Seattle, WA (US);
Trishul A Chilimbi, Seattle, WA (US);
Shuo-Hsien Hsiao, Redmond, WA (US);
Danyel A. Fisher, Seattle, WA (US);
David M. Andrzejewski, Madison, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 12/485,726

(22) Filed: Jun. 16, 2009

(65) Prior Publication Data
US 2010/0318852 A1 Dec. 16, 2010

(51) Int. Cl.
*G06F 9/44* (2006.01)

(52) U.S. Cl.
USPC .............................. 717/124; 717/131; 717/133

(58) Field of Classification Search
None
See application file for complete search history.

(56) References Cited

U.S. PATENT DOCUMENTS

| | | | |
|---|---|---|---|
| 6,549,930 B1 * | 4/2003 | Chrysos et al. | 718/104 |
| 7,143,392 B2 * | 11/2006 | Ii et al. | 717/125 |
| 7,143,394 B1 | 11/2006 | Shadmon et al. | |
| 7,263,632 B2 | 8/2007 | Ritz et al. | |
| 7,469,362 B2 | 12/2008 | Hudson et al. | |
| 7,526,508 B2 | 4/2009 | Tan et al. | |
| 7,605,813 B2 * | 10/2009 | Uthe | 345/440 |
| 2002/0087949 A1 | 7/2002 | Golender et al. | |
| 2003/0056199 A1 * | 3/2003 | Li et al. | 717/127 |
| 2004/0034642 A1 * | 2/2004 | Szilagyi et al. | 707/100 |
| 2004/0117796 A1 * | 6/2004 | Dichter | 718/107 |
| 2005/0021708 A1 * | 1/2005 | Raghuraman et al. | 709/223 |
| 2005/0081206 A1 * | 4/2005 | Armstrong et al. | 718/100 |
| 2006/0041558 A1 * | 2/2006 | McCauley et al. | 707/10 |
| 2007/0067573 A1 | 3/2007 | Bruening et al. | |
| 2007/0150474 A1 * | 6/2007 | Szilagyi et al. | 707/8 |
| 2007/0220513 A1 * | 9/2007 | Hwang | 718/1 |
| 2008/0133973 A1 * | 6/2008 | Mizoe et al. | 714/37 |
| 2008/0148240 A1 | 6/2008 | Jones et al. | |
| 2008/0276025 A1 | 11/2008 | Cherem et al. | |
| 2008/0301714 A1 * | 12/2008 | Martinsen | 719/318 |
| 2009/0271789 A1 * | 10/2009 | Babich | 718/100 |

OTHER PUBLICATIONS

Chun Yuan, et al. Automated known problem diagnosis with event traces. In EuroSys 2006: Proceedings of the 1st ACM SIGOPS/EuroSys European Con-ference on Computer Systems 2006, pp. 375-388, New York, NY, USA, 2006. ACM. ISBN 1-59593-322-0. doi: http://doi.acm.org/10.1145/1217935. 1217972.

(Continued)

*Primary Examiner* — Wei Zhen
*Assistant Examiner* — Daniel P Elliott
(74) *Attorney, Agent, or Firm* — Lee & Hayes, PLLC

(57) ABSTRACT

A system and method for identifying a root cause of a wait in a computer system are provided. Given the identity of a thread of interest and time window, a longest wait period for the thread of interest within the time window is identified. The longest wait period is used as a starting node to generate a ready tree by walking backwards through the data in a system trace to construct a tree of readying events that ready threads for running on a processor. A potentially anomalous chain of events is automatically identified and highlighted in the ready tree. A visualization of the ready tree is presented to a user so that the user can explore the events in the tree and annotate the automatically generated tree to aid in problem diagnosis.

20 Claims, 11 Drawing Sheets

OTHER PUBLICATIONS

Ira Cohen, et al. Correlating instrumentation data to system states: A building block for automated diagnosis and control. In OSDI '04: Proceedings of the 6th Conference on Symposium on Opearting Systems Design & Implementation, pp. 16{16, Berkeley, CA, USA, 2004. USENIX Association.

Li, et al., "Motif Extraction with Indicative Events for System Call Sequence Classification", retrieved on May 12, 2009 at <<http://ieeexplore.ieee.org/stamp/stamp.jsp?arnumber=04406310>>, Fourth International Conference on Fuzzy Systems and Knowledge Discovery (FSKD 2007), 6 pages.

Park, "Core System Event Analysis on Windows Vista", retrieved on May 12, 2009 at http://www.daschmelzer.com/cmg2006/PDFs/096.pdf>>, Microsoft Corporation, 13 pages.

Marcos K. Aguilera, et al. Performance debugging for distributed systems of black boxes. In SOSP '03: Proceedings of the Nineteenth ACM Symposium on Operating Systems Principles, pp. 74{89, New York, NY, USA, 2003. ACM. ISBN 1-58113-757-5. doi: http://doi.acm.org/10.1145/945445.945454.

Mike Y. Chen, et al.Pinpoint: Problem determination in large, dynamic internet services. In In Proc. 2002 Intl. Conf. on Dependable Systems and Networks, pp. 595{604. 2002.

Wang, et al., "Hang Analysis: Fighting Responsiveness Bugs", retrieved on May 12, 2009 at <<http://research.microsoft.com/en-us/people/zhenyug/hang-eurosys08.pdf. EuroSys, Apr. 1-4, 2008 Glasgow, Scotland, UK, 12 pages.

* cited by examiner

VISUALIZATION TOOL FOR SYSTEM TRACING INFRASTRUCTURE EVENTS

TECHNICAL FIELD

The subject matter relates generally to tools for identifying causes of long wait times in computer systems.

BACKGROUND

Software continues to grow in size and complexity to take advantage of increasingly powerful hardware and to cater to the diverse needs of a large and growing market. This increase in software size and complexity when combined with diverse usage scenarios makes it difficult for programmers to develop performant applications. The diverse usage scenarios and software complexity also makes it difficult for system administrators to identify and resolve problems.

To build performant software, developers typically use profiling tools that either instrument a program or use hardware performance counters to identify functions that are time-consuming and to focus their efforts on optimizing these functions. However, this methodology suffers from key limitations. First, only a small subset of likely usage scenarios can be profiled and consequently the application may still perform poorly in many circumstances. Second, with multicore processors quickly becoming mainstream, many applications are multi-threaded and function performance is often dependent on understanding the behavior of other application threads that can execute in parallel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes various exemplary methods, user interfaces, and computer program products for building a tree in part upon ready signals sent from thread to thread. Accordingly, this type of tree may be referred to as a ready tree.

In one implementation, the system presented in this disclosure may include a processor and a memory that stores instructions for execution by the processor. The instructions may comprise a system tracing infrastructure, a tree creation module, and a user interface generation module. The system tracing infrastructure creates a trace of events in the system. The tree creation module automatically extracts events from the trace related to wait periods of threads and then structures those events into a ready tree. The tree creation module structures the events into a ready tree by identifying a context switch that ends a wait period of one of the threads designated as a thread of interest. A parent thread that sends a ready signal to the thread of interest and by doing so enables the context switch is also identified. The tree creation module also identifies a wait period of the parent thread that overlaps with the wait period of the original thread of interest. For this overlapping wait period of the parent thread, an ancestor thread which has sent a ready signal to the parent thread enabling a context switch from the ancestor to the parent thread is also identified. The user interface generation module produces a visual display of the tree so that a user can readily perceive information and relationships contained within the trace.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Developing performant software in computer systems is benefited from an understanding of problems that may detract from a user experience. One type of problem that may be experienced is a long wait during which time a computer system may appear "frozen" or appear to be waiting for no apparent reason. Some waits may occur frequently during the normal operation of a computer system. Other, longer waits experienced by the software threads may be perceived by the user if the wait is long, and thus, lead to a perception of a problem such as a frozen computer system. Information related to the cause of the problem may be captured by a system tracing infrastructure that creates a trace, or a record, of events in the system. This trace information can be useful to sophisticated users such as software developers or system analysts when those users are trying to diagnose the root cause an abnormally long wait. The trace may contain a large amount of information which is available to a user in a relatively user-unfriendly form such as unfiltered text. The root cause of the abnormally long wait may be contained within the trace, but it may be very time consuming for the user to sort through this information and identify the root cause of the wait.

Figure 1:
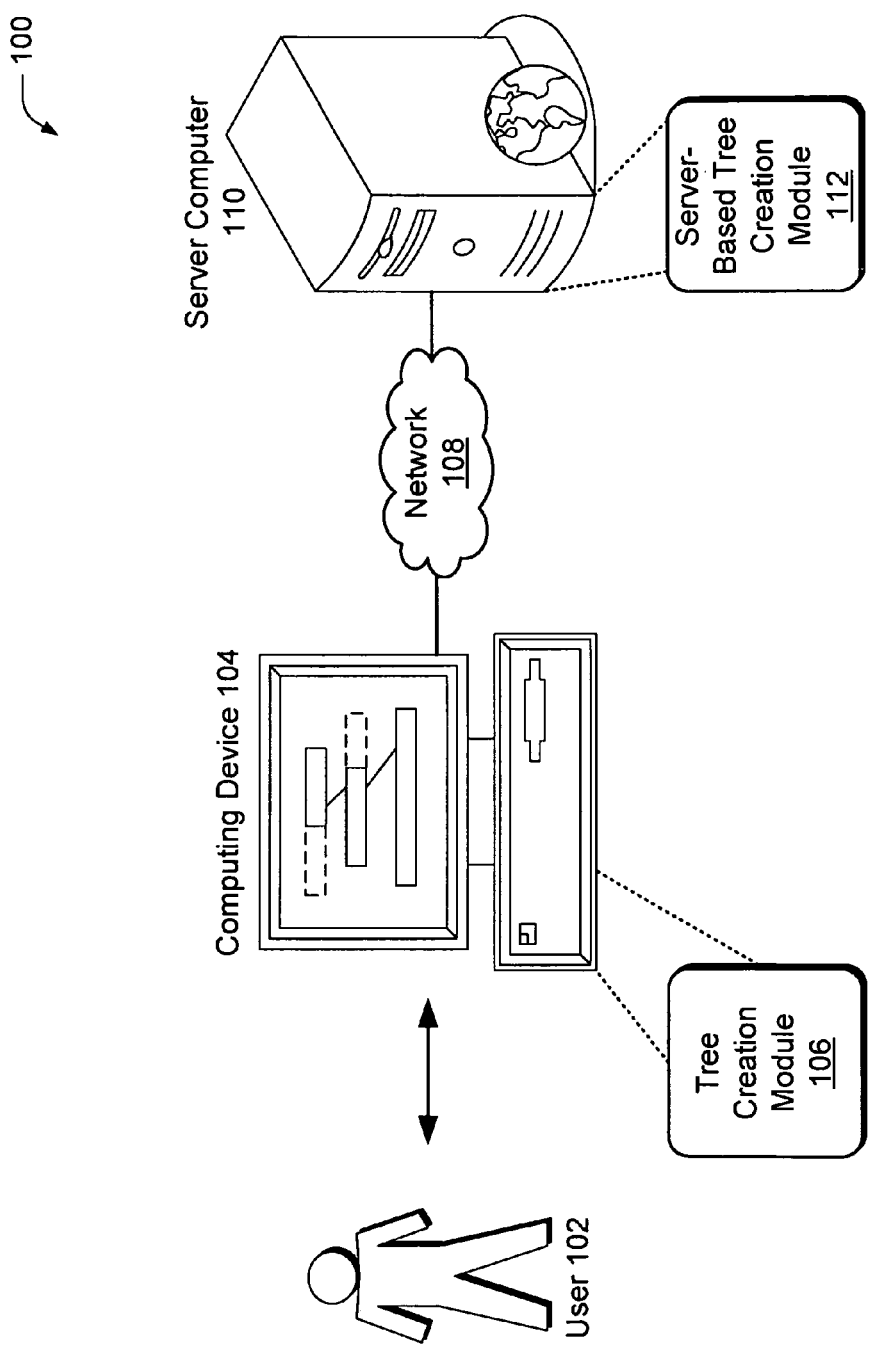
FIG. 1 is a schematic of a system for visualizing system tracing infrastructure events.

FIG. 1 shows a system 100 including a user 102 interacting with a computing device 104 to view an interactive visualization of a ready tree. The ready tree, which is discussed below, may be generated by a tree creation module 106 maintained on the computing device 104. In other implementations, a network 108, including but not limited to the Internet connects the computing device 104 to a server computer 110 containing a server-based tree creation module 112. The ready tree may be created in part by the tree creation module 106 on the computing device 104 and in part by the server-based tree creation module 112 on the server computer 110. In some implementations, such as distributed or cloud computing, the ready tree may be created by a plurality of software modules spread across multiple devices. Moreover, the computing device 104, which presents a visualization of the ready tree and receives input from the user 102, is not limited to the form of a desktop computer, but may include any computing device such as a thin client, terminal device, handheld computer, mobile phone, or other device regardless of form factor.

Figure 2:
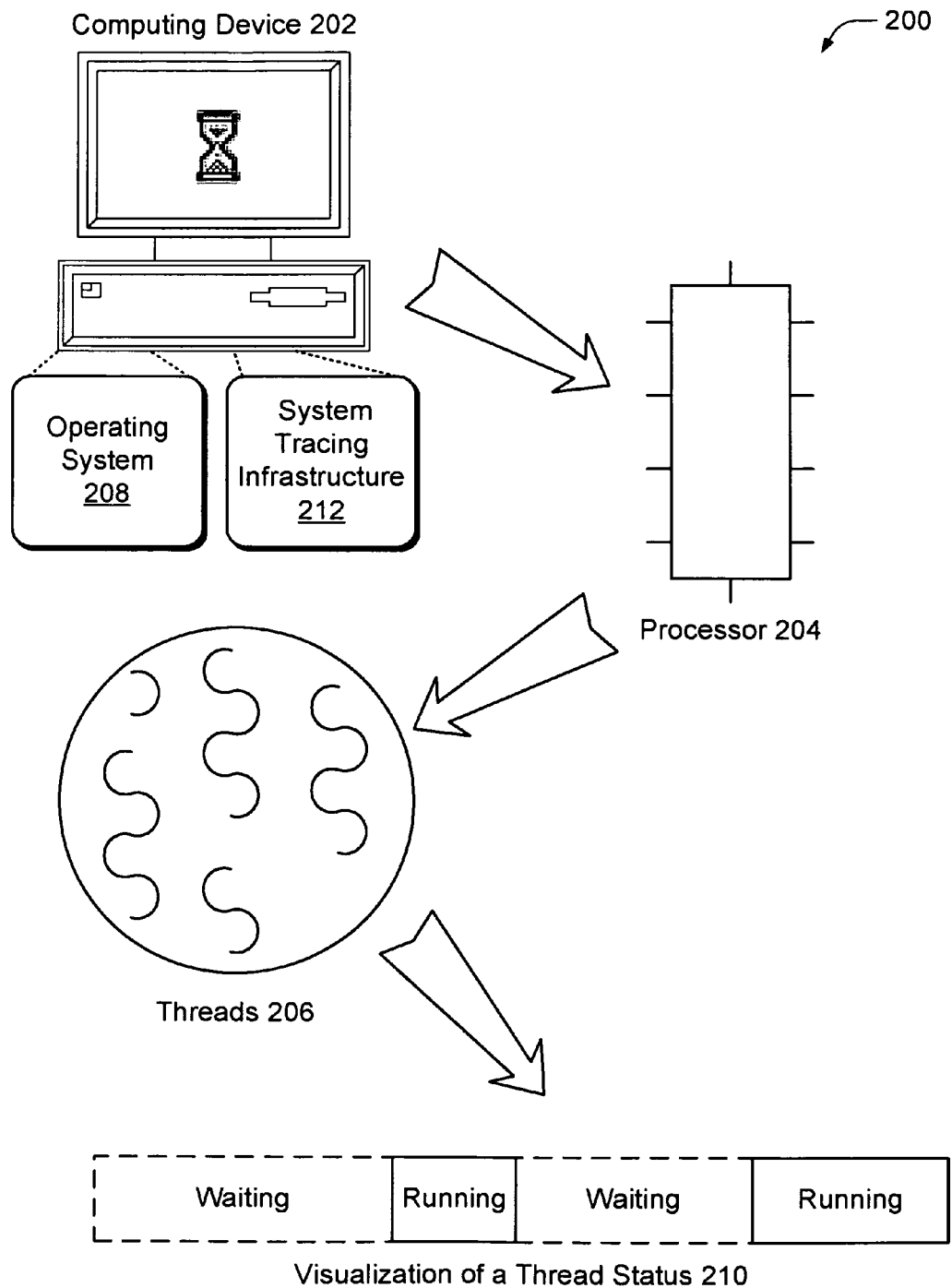
FIG. 2 is a schematic diagram showing a visualization of thread status.

FIG. 2 shows a schematic diagram 200 of a computing device 202, which may be the same or different than the computing device 104 shown in FIG. 1, experiencing a long wait due to such things as an unresponsive application or a task that takes a long time to complete. The long wait may be referred to as a "hang." Computing device 202 includes a processor 204. In other implementations, not shown, the computing device 202 may contain multiple processors and/or processors with multiple cores.

Threads 206 are running on the processor 204. A thread of execution results from a fork of a computer program into two or more concurrently running tasks. An operating system 208 of the computing device 202 may implement threads 206 as elements contained within a process. Multiple threads may exist within the same process and share resources such as memory, while different processes may not share these resources.

On a single processor, such as the processor 204, multithreading generally occurs by time-division multiplexing (e.g. multitasking) in which the processor 204 switches between different threads 206. Taking one thread off of the processor and placing another thread onto the processor may be referred to as "context switching." A context switch is the computing process of storing and restoring the state (context) of a central processing unit (CPU) such that multiple processes can share a single CPU resource. The context switch is one feature of a multitasking operating system. Context switches are usually computationally intensive and much of the design of operating systems is to optimize the use of context switches. What constitutes the context is determined by the processor 204 and the operating system 208. This context switching generally happens frequently enough that the user 102 perceives the threads 206 or tasks as running at the same time. On a multiprocessor or multi-core system, the threads 206 or tasks will generally run at the same time, with each processor or core running a particular thread 206 or task.

A single one of the threads 206 will alternate between running and waiting until the thread's work is complete. If the thread 206 is waiting for a long period of time that wait may be perceived by the user 102 of the computing device 202. One element of the ready tree is a visualization of a thread status 210. The visualization of a thread status 210 differentiates between periods of time during which the thread 206 is running on the processor 204 and periods of time during which the thread 206 is waiting. In one implementation, the thread 206 is represented as a horizontal bar 210 with run periods represented by a solid line and wait periods represented by a dashed line. Other formats for visualizing run periods and wait periods of a thread are also included within the scope of this disclosure.

Event Tracing

Computing device 202 may include as part of the operating system 208 and/or non-operating system software an infrastructure 212 to record a log, or "trace," of events that have happened on the computing device 202. One example of a system tracing infrastructure 212 is Event Tracing for Windows (ETW) which is a high-speed tracing facility provided by the Windows® Operating System. The data contained in the trace is used to generate the ready tree.

The system tracing infrastructure 212 may use a buffering and logging mechanism implemented in the operating system kernel to provide a tracing mechanism for events raised by both user-mode applications and kernel-mode device drivers. Additionally, the system tracing infrastructure 212 may allow for enabling or disabling tracing dynamically, thus making it possible to perform detailed tracing in production environments without requiring reboots or application restarts. A logging mechanism of the system tracing infrastructure 212 may use per-processor buffers that are written to disk by a separate writer thread. The system tracing infrastructure 212 may use buffers maintained by the kernel in order to allow system tracing to continue even if the computing device 202 is experiencing application crashes or hangs.

The system tracing infrastructure 212 may contain four main components: an event trace session infrastructure, a trace provider, a controller, and a trace consumer. Event trace sessions are where buffering and logging take place. Per-processor kernel buffers may be used to log events from the trace providers without using a lock, and the buffers are then written to a file by a separate writer thread. The trace provider provides events to the event trace session infrastructure. Any recordable activity of importance may be an event, and the event is represented by a piece of data logged to the system tracing infrastructure 212. In addition to a fixed event header, an event may contain user data from each instrumentation point. A trace provider may include but is not limited to, a user mode application, a kernel mode device driver, or the operating system kernel itself. The trace provider first registers with system tracing infrastructure 212 and then sends events from various points in the code by calling an appropriate application programming interface (API) for logging the events.

The controller may start, stop, or update trace sessions in the kernel as well as to enable or disable trace providers to send traces. Controller functions are typically invoked by system administrators and performance analysts to collect traces from one or more trace providers.

Finally, the trace consumer is an application that reads trace files or listens to active trace sessions in real time and processes logged events. An event trace session infrastructure works as a broker that relays the events from one or more trace providers to the trace consumer. The trace consumer may use the data regarding the events in the trace to do such things as generate a ready tree.

In the system tracing infrastructure 212, sessions and providers may exist in different spaces. The controller is the one that starts and stops sessions and maps providers to sessions dynamically. Thus, the controller can choose to map several trace providers to a session, disables some of them after a while, and map another trace provider to the same session. Sessions operate in the kernel and are not tied to providers. Likewise, the providers may not be aware of which sessions their events are being logged to.

When logging events are given by the trace provider, the system tracing infrastructure may add additional data items such as thread and process ID, a current CPU usage of the logging thread, and a timestamp. These fields are recorded in an event header and passed onto event consumers along with the event content. These fields may be used later to assist in provider activity analysis. Traces typically are long and complex, thus manual diagnosis of performance problems (e.g., a wait or hang) using raw trace data may be time consuming and inefficient.

Lock-Contention Problems

Many performance problems in multi-threaded operating systems involve lock-contention, where one thread 206 spends a long time waiting for another thread to release a lock on a shared resource. Lock-contention occurs when multiple threads try to gain access to the same lock. For example, two threads of an e-mail application may both need to modify a same file on a disk. An operating system 208 may be set up so that a thread must acquire a file lock exclusively before modifying a file. Only one thread 206 may have the lock at any given time. Locks may be implemented by an operating system in a variety of ways such as with flags or with mutual exclusion algorithms (mutex). This type of operating system 208 prevents conflicting changes in the file from multiple threads 206 attempting to modify the file simultaneously. Accordingly, most locking designs block the execution of the thread 206 requesting the lock until it is allowed to access the locked resource. Therefore locks are one cause of system waits or hangs.

Ready-Tree Construction

Figure 3:
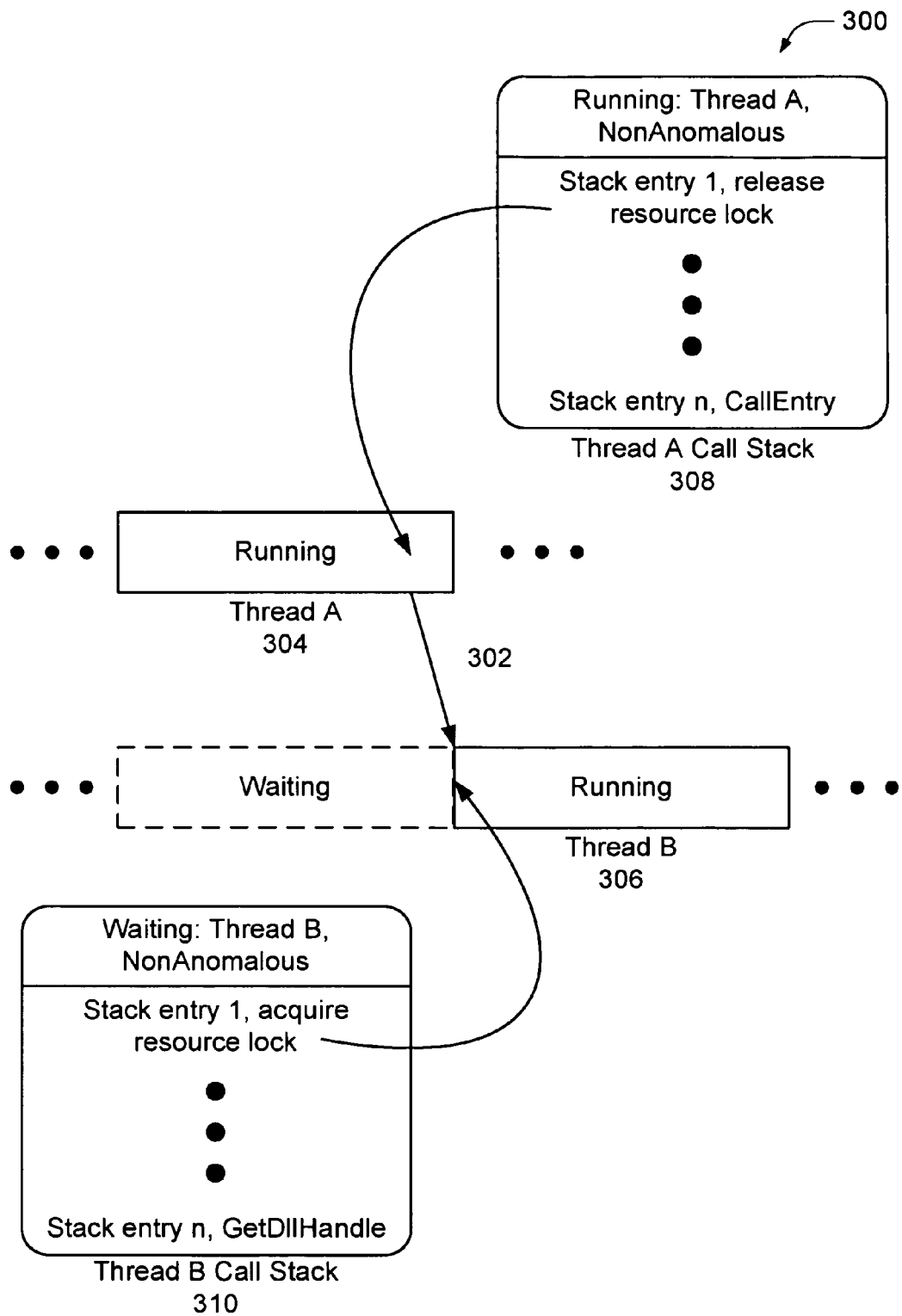
FIG. 3 is a schematic diagram showing a causal connection between threads determined by matching lock release and lock acquire events.

FIG. 3 shows a schematic diagram 300 of a linking 302 between two threads. The linking arises from the transition from one thread to another around a context switch. Before a context switch a thread receives a ready signal and is "readied" to run on a processor 204. After receiving the ready signal the thread is moved from a wait queue to a ready queue. Threads in the ready queue are scheduled to run on the processor 204 according to a priority determined by an operating system 208. For example, Thread A 304 may be switched out of the processor 204 so that Thread B 306 can run on the processor 204. Thread B 306 includes at least a period of waiting followed by a period of running. Thread A 304 includes at least a period of running that temporally overlaps with the period of waiting of Thread B 306. The link 302 may be represented in some implementations as an arrow from the running thread which is switched out (e.g., Thread A 304) to the waiting thread which is switched in (e.g., Thread B 306). One implementation of this visualization starts the arrow 302 at a point in time when the ready signal is received by Thread A 304 and ends the arrow 302 on Thread B 306 at the time when Thread B 306 is context switched in. Thus, the arrow 302 starts at a point before the end of Thread A 304 and ends at the start of Thread B 306. This transition from a period of waiting on the wait queue to the ready queue and ultimately to running on the processor 204 can occur due to multiple types of events such as lock acquisition when the thread is able to acquire a lock (e.g., Thread B 306) managing a global resource after the global resource is released by another thread (e.g., Thread A 304).

As previously discussed, a system tracing infrastructure 212 keeps track of context switch events on the processor 204 and ready thread events. Context switch events may contain data including a timestamp of the event, a thread being switched out, a thread being switched in, and a CPU. The system tracing infrastructure 212 also keeps track of call stacks associated with these events such as Thread A Call Stack 308 and Thread B Call Stack 310. Stack entries contain information about the functions currently on the stack of a thread, which provide information about what the thread is doing at the moment that the stack entry is recorded. A call stack is a dynamic stacked data structure that stores information about the active subroutines of a computer program. There is usually one call stack associated with each thread. A call stack is composed of stack entries which are also referred to as stack frames or activation records. The stack entries are machine dependent data structures containing subroutine state information. Exemplary call stacks Thread A Call Stack 308 and Thread B Call Stack 310 both include a header indicating a thread name and a thread status as well as a plurality of stack entries 1-$n$.

The linking 302 from the Thread A 304 to Thread B 306 may be identified by matching functions from Thread A Call Stack 308 to Thread B Call Stack 310. Matching functions such as a context switch event or a ready thread event from the respective call stacks of two threads such as Thread A 304 and Thread B 306 may make it possible to verify whether or not the behavior of Thread A 304 is responsible for Thread B 306 being switched onto the processor 204. The link 302 of Thread A 304 to Thread B 306 may be thought of as a causal link explaining why the waiting period of Thread B 306 has ended.

In one example, the waiting period of Thread B 306 is caused by a lock contention. For some operating systems there may exist a list of functions that are known to be lock acquire or lock release functions. A lock-related call may be recognized by matching calls from a call stack to a list of calls known to be lock acquire calls or lock release calls. In some implementations, a list of known lock-related calls may be stored in a configuration file. For the known locks, it is possible to examine the functions on the parent thread call stack (e.g., Thread A Call Stack 308) and the switched-in thread call stack (e.g., Thread B Call Stack 310). Thread A Call Stack 308 includes a stack entry 1 for "release resource lock" and Thread B Call Stack 310 includes a stack entry 1 for "acquire resource lock." Thus, it is possible to verify that Thread A 304 is releasing the lock for which Thread B 306 is waiting by matching the acquire resource lock call to the release resource lock call. In other implementations, the configuration file may store list of calls related to possible causes of waits other than just lock-related calls. For example, calls related to waiting for a network packet to arrive may be used to identify a potential root cause of a wait that does not involve a lock.

FIG. 3 shows a simple ready tree with two threads, Thread A 304 and Thread B 306, with one link 302 indicating that Thread A 304 readied Thread B 306 for running on the processor 204.

Figure 4:
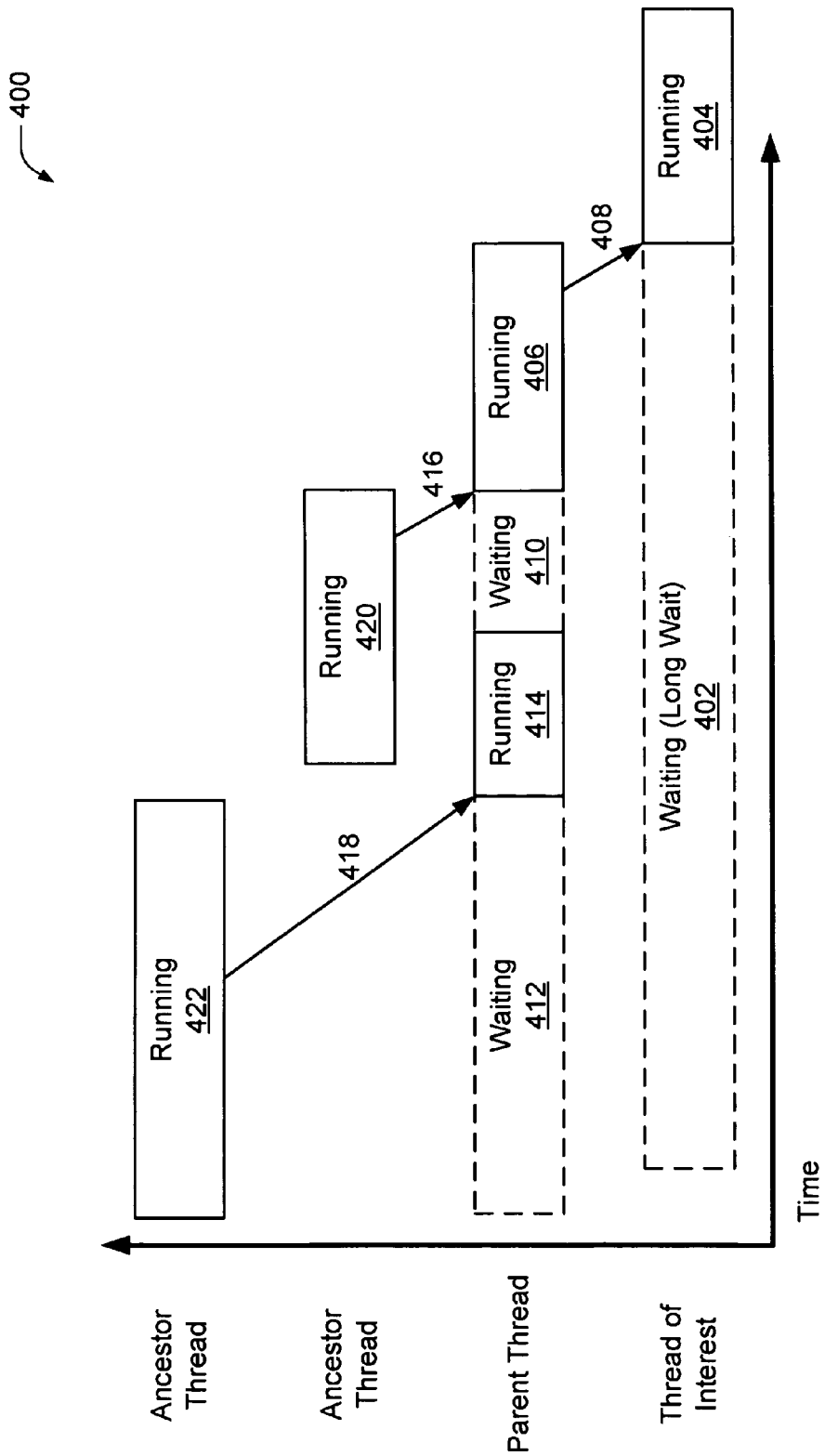
FIG. 4 is a schematic diagram showing an exemplary ready tree.

FIG. 4 shows an exemplary ready tree 400. The "ready tree" 400 provides a visual representation of events that ready a thread for running on a processor 204. In one exemplary implementation, the horizontal axis denotes time, and the vertical axis is sectioned into different threads. Each thread has its own slice of the vertical space. Ready tree generation may begin by identifying a thread that has experienced a long wait 402. Periods of waiting, or wait periods, are indicated by dashed lines. Periods in which a thread is running, or run periods, are indicated by solid lines. The thread shown at the bottom of the ready tree 400 may be thought of as a "thread of interest" because the user 102 is interested in identifying a root cause of this long wait 402. The thread of interest may be indicated manually by the user 102. The user 102 can indicate the thread of interest in various ways including entering the name of the thread, selecting the thread from a list of threads, or selecting an application or window that is non-responsive and appears hung. In other implementations, the thread of interest is identified by a predefined performance event such as a wait period that exceeds a time threshold.

A time period of interest may also be designated either by the user 102 or by the system. In some implementations the time period is from the moment the thread of interest was indicated back to the start of the trace file. In other implementations the time period may be a predefined length of time such as 15 or 60 seconds prior to the indication of the thread of interest. Given a time window and a thread of interest it is possible to identify wait periods of the thread of interest. A longest wait period 402 from the wait periods of the thread of interest may form a base of the ready tree 400.

A trace may be analyzed to identify an event that signaled the end of the waiting period 402 and switching of the thread of interest to a period of running 404 on a processor 204. The event that signaled the end of the waiting period 402 may be a context switch event or a ready thread event. The event that allows the thread of interest to finally run may be caused by another thread called a parent thread. For example, work done while the parent thread was running 406 enabled the thread of interest to be switched onto the processor 204 so that the thread of interest could run 404. The event which readied the thread of interest to run is indicated as a link 408 between the parent thread and the thread of interest.

Like the thread of interest, the parent thread may also have periods of waiting 410, 412 as well as periods of running 406, 414. Since the thread of interest is not able to switch from waiting 402 to running 404 until the final period of running 406 of the parent thread, earlier waits 410, 412 of the parent thread are indirectly responsible for the long wait 402 of the thread of interest. Events in the history of the thread of interest which occurred prior to the long waiting period 402 may be presumed unrelated to a cause of the long wait because the thread of interest was not waiting during that earlier time. Accordingly, wait periods of the parent thread 410 and 412 that overlap in time with the longest wait period 402 of the thread of interest are used for further expansion of the ready tree 400.

Events that terminated the wait periods 410, 412 of the parent thread are identified. These events in turn provide links 416, 418 to earlier threads referred to as ancestor threads. Periods of running 420, 422 of each ancestor thread caused an event that ended a corresponding wait period 410, 412 of the parent thread. The process of identifying a "parent" thread that is responsible for ending a wait period of a "child" thread may be followed backwards in time until all waits that overlap with the long wait period 402 of the thread of interest are identified. In other implementations, generation of the ready tree 400 ends when a stop condition is reached. The stop condition may include a wait that is not lock-related, a user-specified recursion depth, or reaching the beginning of the trace file. In other words, the ready tree 400 is generated by starting with a long wait of a thread of interest 402 and following ancestor waits which ended after the long wait began.

This process for creating the ready tree 400 may create a ready tree that includes multiple ready chains leading up to the final long wait 402 for the thread of interest. The ready chains include a plurality of nodes which are the wait periods (e.g., 402, 410, 412) and the associated run periods (e.g., 404, 406, 414, 420, 422) of a thread and links 408, 416, 418 between the nodes. For example, the ready tree 400 includes two ready chains. The first ready chain begins with nodes 402/404 connected by link 408 to nodes 410/406 which in turn is connected by link 416 to node 420. The second ready chain also begins with nodes 402/404 connected by link 408 to nodes 412/414 and then to node 422.

A typical ready tree may have many more nodes, links, and ready chains than the simplified schematic diagram shown in FIG. 4. Even though ready trees are simplified and organized representations of data from a system trace, the ready trees themselves may be complex. However, in this implementation, there is an interactive graphical user interface that enables the user 102 to more easily review and interact with a representation of a ready tree 400 by providing a navigable and zoomable user interface.

Behavior of a thread and a ready tree 400 may be presented as a binary condition: either running or waiting. The actual behavior of a thread may be somewhat more subtle. Normally when a thread is running, it is doing actual work on its own behalf. Sometimes, however, a thread may be woken up by a timer or an interrupt call. During these "false runs," the cause of the wait has not yet been resolved, but the thread is running in response to a routine timer wake up check, or the thread is performing work for other threads. False runs include, but are not limited to, timer wake up and Asynchronous Procedure Call (APC) interrupts. In both cases the activity of the thread is classified as waiting even though the thread may be running on a processor 204. The false starts may be identified by examining a call stack of the thread that signaled a timer wake up or an APC interrupt. For example, a call stack may contain the function KiTimerExpiration in the case of a timer wake up or the function KeInsertQueueApc in the case of an APC interrupt.

The period of time the thread spends waiting includes time that the thread spends on the waiting queue as well as the time it spends on the ready queue before the thread is switched in to run on the processor 204. Time spent in the ready queue is generally unaffected by the type of events which may cause a hang or long wait. Accordingly, in some implementations, analysis is based only on time spent in the waiting queue. Thus, the calculation of wait time includes the time from when the previously running thread was switched out until the time when the ready signal is sent to the next thread. Threads can spend time waiting off the processor 204 for many different reasons, locks being one of them.

In some implementations the ready tree 400 may be designed to present information related to lock contention problems. Any other source of waits for threads in a computing device 202 may also be the basis for creating a ready tree 400. However, a ready tree 400 that only looks at lock-related functions is discussed as one exemplary ready tree 400. When analyzing lock-contention behavior, lock-related waits may be identified by examining the stack 308, 310 of the thread as discussed above with respect to FIG. 3.

Returning to FIG. 4, diagnosis of a lock-contention problem begins with analysis of the trace for the thread of interest to identify a longest lock-related wait period 402 within the given time window. In some implementations, a wait period may be designated as a lock-related wait period by examining a call stack of a readying thread 308 at the time of the ready thread event and a call stack of a switched in thread 310 for the presence of lock-related functions. Lock-related functions include lock acquire calls and lock release calls. In other implementations, a call stack of the readying thread 308 at the time of the ready thread event is not examined, and only the call stack of the switched in thread 310 is examined for lock-related functions. If one of the functions is a known lock-related function, the wait period is designated as a lock-related wait.

A ready signal 408 from the parent thread that ends the long lock-related wait period 402 of the thread of interest is identified. Next, the parent thread is examined for any lock-related wait periods that overlap in time with the long lock-related wait period 402 of the thread of interest. Any waits 410, 412 of the parent thread while it is in possession of the lock requested by the thread of interest may delay transfer of the lock to the thread of interest.

In the ready tree 400, the parent thread is waiting for two separate ancestor threads to finish tasks and release the respective locks. One of the ancestor threads may in turn be waiting for a network operation to complete. The sequence of waits may lead to the thread of interest waiting for an unusually long period of time 402 for access to the lock. In this situation, the thread of interest is hung, and structuring trace data into a ready tree may assist in indentifying a root cause of the hang. In this example, the root cause may be a delay in the network operation (not shown) which resulted in a chain of lock contentions.

Anomaly Detection

Figure 5:
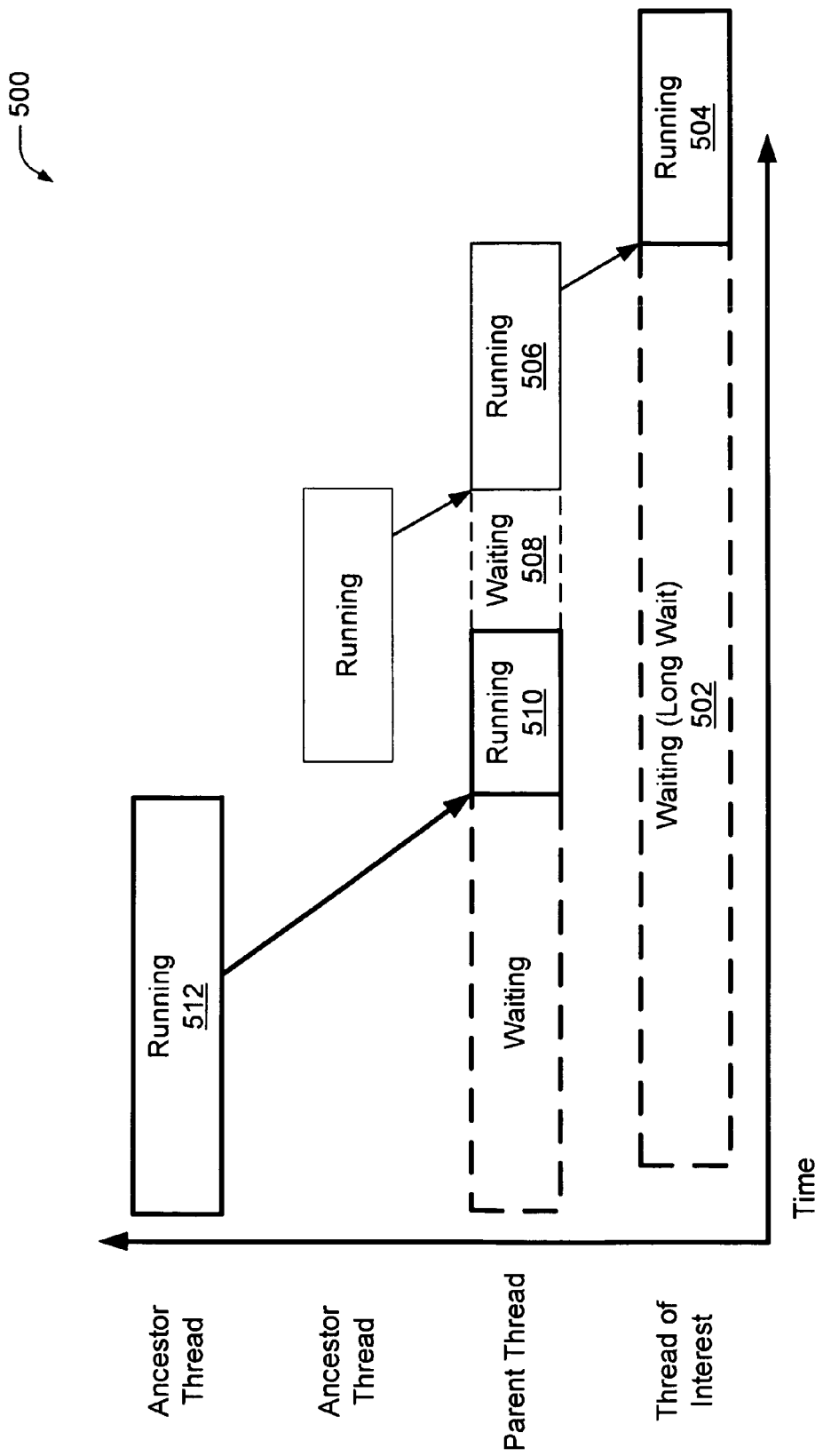
FIG. 5 is schematic diagram showing an exemplary ready tree and an exemplary anomalous ready chain.

FIG. 5 shows an exemplary ready tree 500 with a highlighted ready chain. A ready tree generated from actual trace data may present a lot of information about a thread state. Since all waits of a parent or ancestor thread that overlap with the long wait 502 of the thread of interest may be followed in the creation of the ready tree, the ready tree may quickly become very large. In order to help the user 102 navigate through this information, an interactive graphical user interface provides a tool for visualization of the ready tree 500. As a further aid to navigating information contained in the ready tree 500, a ready chain in the ready tree 500 may be automatically identified as the most likely root cause of the perceived long wait period 502. In the exemplary ready tree 500, heavier-weight lines surrounding nodes 502/504, 512/510, and the link from 514 to 510 indicate a most anomalous ready chain. The highlighting or visual emphasis of the anomalous ready chain may be indicated by any change in the visual display of the nodes such that nodes in the anomalous ready chain are distinguishable from other nodes in the ready tree 500.

Anomaly detection strategies include, but are not limited, to chain-based strategies and cross-trace based strategies. In one implementation of chain-based anomaly detection, the ready chain with a longest average wait period is taken to be anomalous and the entire chain is highlighted as the anomalous ready chain. Average wait time is a reasonable metric, because one feature of a ready tree is to serve as a tool for identification of a chain of events leading up to the observed long wait period 502. If the average wait time along a chain is long, then every thread in the chain experienced a long wait on average. Other possible metrics suitable for chain-based strategies include, but are not limited to, a longest median wait period, a longest total wait period, a greatest number of nodes in the chain, a greatest number of anomalous wait periods, a wait period in a predetermined quantile of wait times, or combinations thereof. The maximum wait time of a chain may also be used as a metric for a chain-based strategy, but every chain in the ready tree includes the long wait period 502 and the long wait period 502 could be the longest wait in the chain skewing the results if the maximum weight time is the metric.

Figure 6:
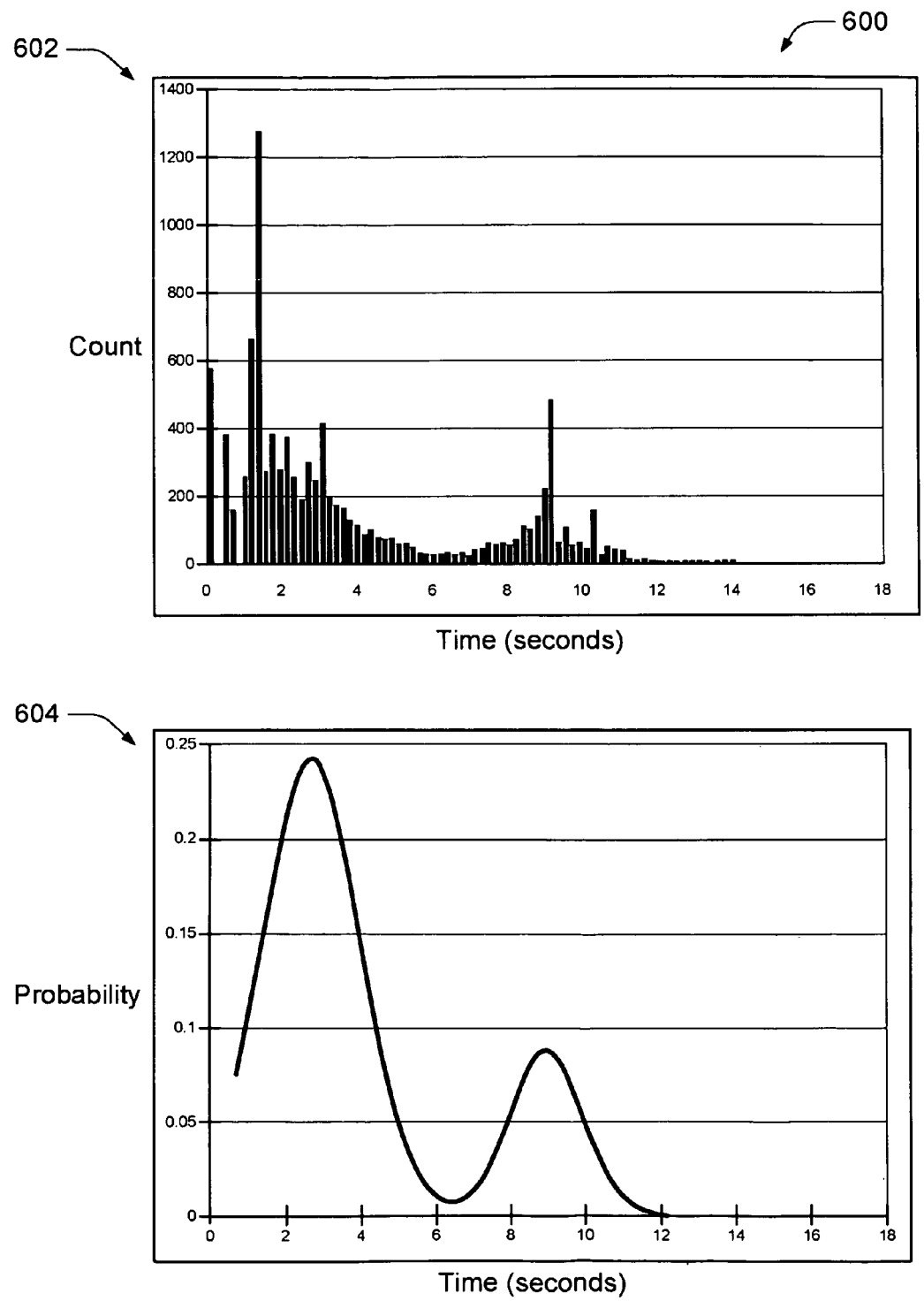
FIG. 6 is a graph of a histogram of historical wait periods represented by a probabilistic model.

FIG. 6 shows a graph 600 of wait periods analyzed by a cross-trace based anomaly detection strategy. Cross-trace analysis provides flexible anomaly detection of individual waits rather than entire ready chains. Each wait is grouped by the event which caused the wait (i.e., in the case of lock-related functions every wait associated with the same set of lock-related functions is grouped). For each event, a histogram 602 of historical wait periods is created. The data to create the histogram 602 is extracted from past traces performed by the system tracing infrastructure 212. This historical data may be stored in a database. The histogram 602 of historical wait times is modeled with a probabilistic model selected from a candidate set of probabilistic models. The candidate set of probabilistic models includes, but is not limited to, an exponential model, a Gamma model, a Gaussian model, and a mixture of Gaussians model. Some the candidate models may represent a symmetric distribution of data (e.g., the Gaussian model), but wait time distributions are often not symmetric. To resolve this problem, a nonlinear transform may be applied to the historical weight time data so that it becomes more symmetric like the Gaussian, or other, model. The nonlinear transform may convert the historical wait times using a log function, which has the effect of shrinking the larger values and expanding the smaller values. After fitting models from the candidate set probabilistic models to the transformed data, a best fitting model is selected using a standard non-parametric test for goodness of fit. One example of a non-parametric test for goodness of fit is the Kolmogorov-Smirnov test. For example, a log-transformed histogram of historical wait times may be best fit by a mixture of Gaussians model 604.

Given a probabilistic model of the historical wait times for an event, a probability of a wait period of a certain length of time may be calculated by using the corresponding probabilistic model. If the probability for a wait period falls below a certain probability threshold, then that wait may be identified as an anomalous wait period. The probability threshold may be set at any level, for example, all wait periods with a modeled probability of less than 5% could be identified as an anomalous wait periods. The mixture of Gaussians model 604 shown in FIG. 6 may be interpreted to indicate that, depending on the probability threshold, all wait times greater than 11 seconds are to be identified as anomalous wait periods.

Interactive User Interface

Figure 7:
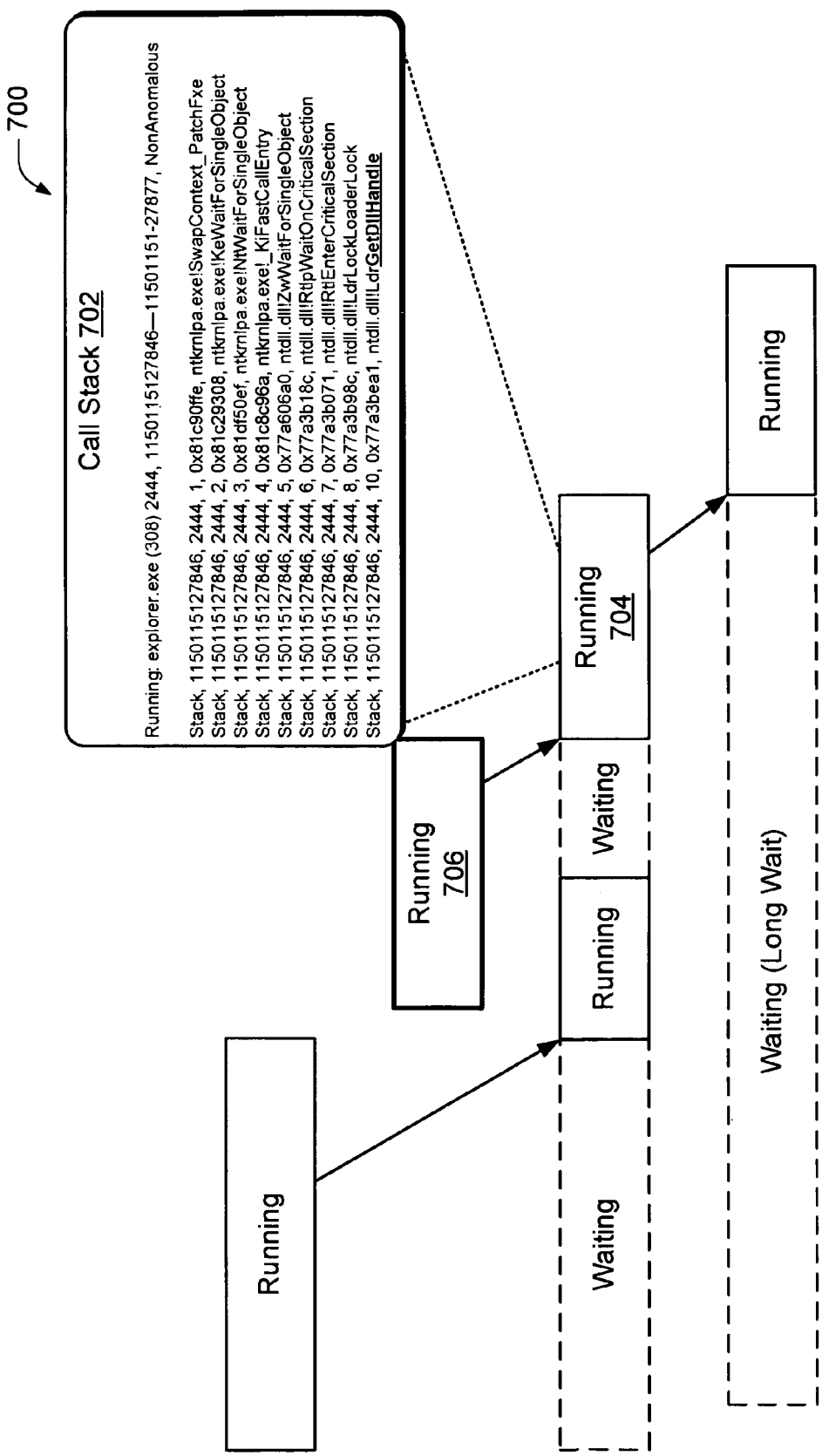
FIG. 7 is a schematic diagram showing an exemplary ready tree and an exemplary listing of call stack events.

FIG. 7 shows a visual representation of an interactive ready tree interface 700. The visual representation of the interactive ready tree interface 700 may include information from call stack events. Each node of the ready visual representation tree interface 700 may be configured to reveal associated call stack events 702 in response to a user input. One example of the user input is clicking on a node 704 with a cursor controlled by a pointing device (e.g. mouse.)

The interactive user interface 700 also allows for regular expression search of information contained in the ready tree. By searching through the ready tree including the underlying stack events, the user 102 may be able to determine the root cause of a wait or hang. For example, in response to the user 102 typing "GetDllHandle" into a search box, a user interface may highlight or emphasize nodes (e.g., node 704) for which the corresponding call stack includes the text "GetDllHandle". The user 102 may cycle through all the nodes and links matching a certain set of call stack functions by entering the regular expression and repeatedly making a single input such as clicking a "Find" or "Tab" button. This is useful for chaining together related events.

The interactive user interface 700 also allows for the user 102 to manually annotate the anomalous ready chain if the default highlighted ready chain is not correct. FIG. 5 shows one implementation of a ready chain that is automatically identified as the anomalous ready chain. The user 102 may decide that the automatic process identified the wrong ready chain. In some implementations of the interactive user interface, clicking on a node opens up a menu where the user can check or uncheck an anomaly flag. For example, a node 706 is automatically identified as non-anomalous, but in response to a user annotation of the node 706 the status was changed from non-anomalous to anomalous. Alternatively, a node automatically marked as anomalous may be annotated by the user 102 so that the nodes status is changed to non-anomalous. Manual changes may be saved to a database or other storage at the time the changes are made or when the program exits. The manual annotations provide feedback that may be used to improve the automatic anomaly detection algorithms.

Exemplary Processes

For ease of understanding, the methods discussed in this disclosure are delineated as separate steps represented as independent blocks. However, these separately delineated steps should not be construed as necessarily order dependent in their performance. The order in which the processes are described is not intended to be construed as a limitation, and any number of the described process blocks may be combined in any order to implement the method, or an alternate method. Moreover, it is also possible that one or more of the provided steps will be omitted.

The processes are illustrated as a collection of blocks in logical flowcharts, which represent a sequence of operations that can be implemented in hardware, software, or a combination of hardware and software. For discussion purposes, the processes are described with reference to the system shown in FIG. 1, the thread visualization shown in FIG. 2, and the user interface shown in FIG. 7. However, the processes may be performed using different architectures and devices. Moreover, the system and ready trees described herein may be used to perform different processes.

Figure 8:
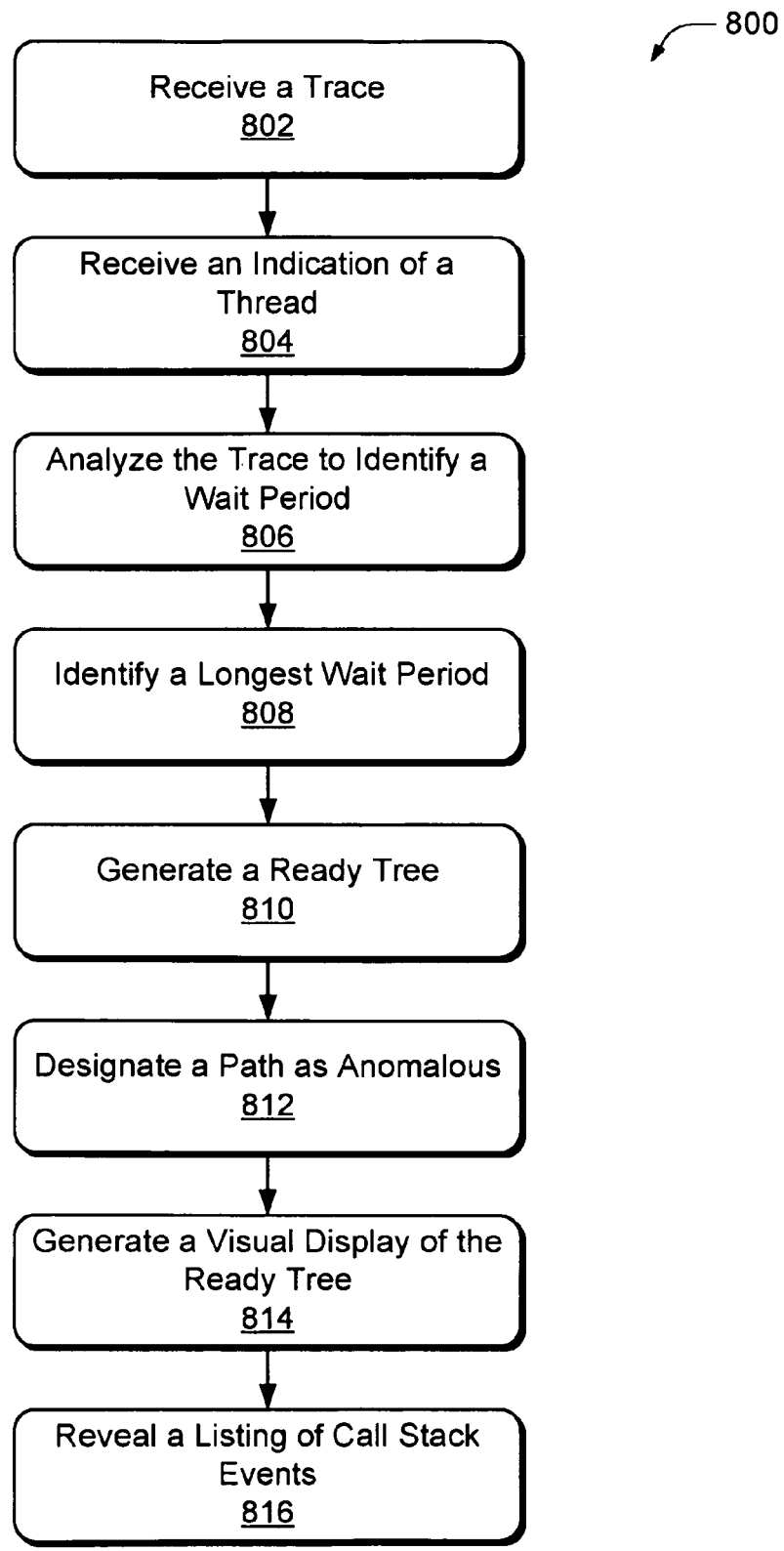
FIG. 8 is a flowchart showing an exemplary method of generating a visual display of an interactive ready tree.

FIG. 8 illustrates an exemplary flowchart of a process 800 for generating a visual display of the interactive ready tree. The interactive ready tree generated by process 800 may be similar to the interactive ready tree shown in FIG. 5. At block 802 a trace of system events is received from a system tracing infrastructure 212. As discussed above, the system tracing infrastructure 212 may include a buffering and logging mechanism implemented in an operating system kernel to trace events raised by user-mode applications and events raised by kernel-mode device drivers. At block 804 indication of a thread of interest is received. The indication may be a user input or a predefined performance event. At block 806 a trace is automatically analyzed to identify wait periods of the thread of interest within a time window. The wait periods for both the thread of interest and other threads include periods of threads waiting off processor, threads responding to a timer wake up, and threads responding to an asynchronous procedure call.

At block 808 a longest lock-related wait period from the wait periods of the thread of interest is identified. The wait period is recognized as lock-related when a call stack of the thread of interest includes a lock-related call. In some implementations, the lock-related call is identified from the calls in the call stack by matching calls in the call stack to a list of calls known to be lock acquire or lock release calls. The list of calls may be maintained in a configuration file. The longest lock-related wait period is the wait period that spends a greater amount of time waiting then other lock-related wait periods within the time window. At block 810, a ready tree of thread status is automatically generated. The longest lock-related wait period of the thread of interest may be thought of as a starting point for generating the ready tree. An exemplary process for generating a ready tree is discussed in more detail with respect to FIG. 9 below.

At block 812 a path in the ready tree from the longest lock-related wait period for the thread of interest to a potential root cause of the wait is designated as an anomalous path. The ready tree may include many branches and thus many paths that could potentially be an anomalous path. In some implementations, a path is designated as the anomalous path because the average wait period of the nodes in the designated path is longer than an average wait period of nodes in other paths in the ready tree. At block 814, a visual display of the ready tree is generated for display in the user interface. In some implementations a computing device which creates a data structure representing the ready tree (e.g. server 110) is different than a computing device (e.g. computing device 104) that presents the data structure as a ready tree in the user interface. The visual display of the ready tree represents wait periods and run periods of threads as nodes and links between the nodes representing respective ready signals or context switches. The visual display may include indication of the nodes and links in the anomalous path by highlighting those nodes and links.

At block 816 a listing of call stack events for a node in the ready tree is revealed in response to receiving an indication of the node on the visual display of the ready tree. For example, the user 102 may click on a node in the ready tree and in response to that indication the listing of call stack events may be displayed such as shown in FIG. 7.

Figure 9:
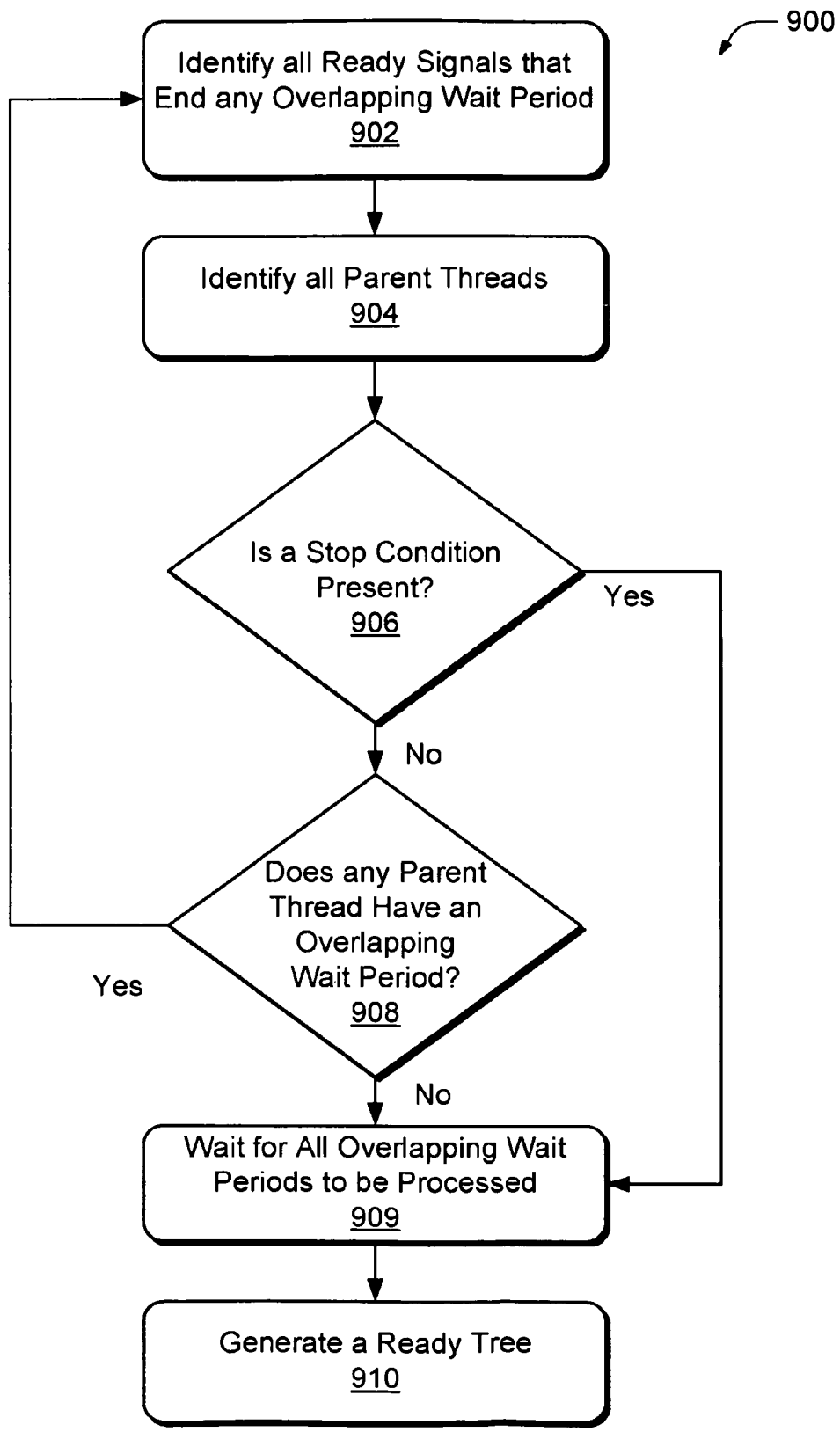
FIG. 9 is a flowchart showing an exemplary method that recursively repeats to generate a ready tree.

FIG. 9 illustrates an exemplary flowchart of a process 900 that recursively repeats to generate a ready tree. At block 902 a ready signal from the trace that signals an end to a longest lock-related wait period for the thread of interest is identified. The ready signal readies a thread of interest. At block 904 a parent thread is identified. In an initial iteration, the parent thread is a parent to the thread of interest. The ready signal may identify both the thread to be readied (e.g., the thread of interest) and a parent thread that does the readying. By identifying two threads the ready signal may serve as a link between the two threads.

At block 906 the process 900 proceeds to the "no" branch to block 908 if a stop condition is not present. The stop condition may include identification of a not lock-related wait period, reaching a user-specified recursion depth, or reaching a beginning of the trace file. If the stop condition is present, the process 900 proceeds to the "yes" branch to block 910. At block 910 all overlapping wait periods have been followed and processed. After there are no more un-processed overlapping wait periods, at block 912 nodes and links for inclusion in the ready tree have been identified and it is possible to generate the ready tree.

Returning to block 908, identification of nodes and links continues. If the parent thread has an overlapping lock-related wait period with the longest lock-related wait period of the thread of interest, the process 900 proceeds to the "yes" branch and returns to block 902. Wait periods of the parent thread are also identified as lock-related wait periods when a call stack of the parent thread includes a lock-related call. When the parent thread does not have an overlapping lock-related wait period, because the parent thread is running or in some status other than waiting, the process 900 follows that "no" branch to block 910 and waits for any other overlapping wait periods to be processed.

Upon returning to block 902 the process 900 repeats for lock-related wait periods of the parent thread. In subsequent iterations a ready signal from a parent of the parent thread, referred to as an ancestor thread in FIGS. 4 and 5, that ends the lock-related wait period of the parent thread is identified. Upon returning to block 904, a parent of the parent thread (e.g., ancestor thread) is identified. The process 900 of identifying previous generations of threads can repeat until either a stop condition is present or the thread being examined does not have a lock-related wait period that overlaps with the longest lock-related wait period for the thread of interest.

Figure 10:
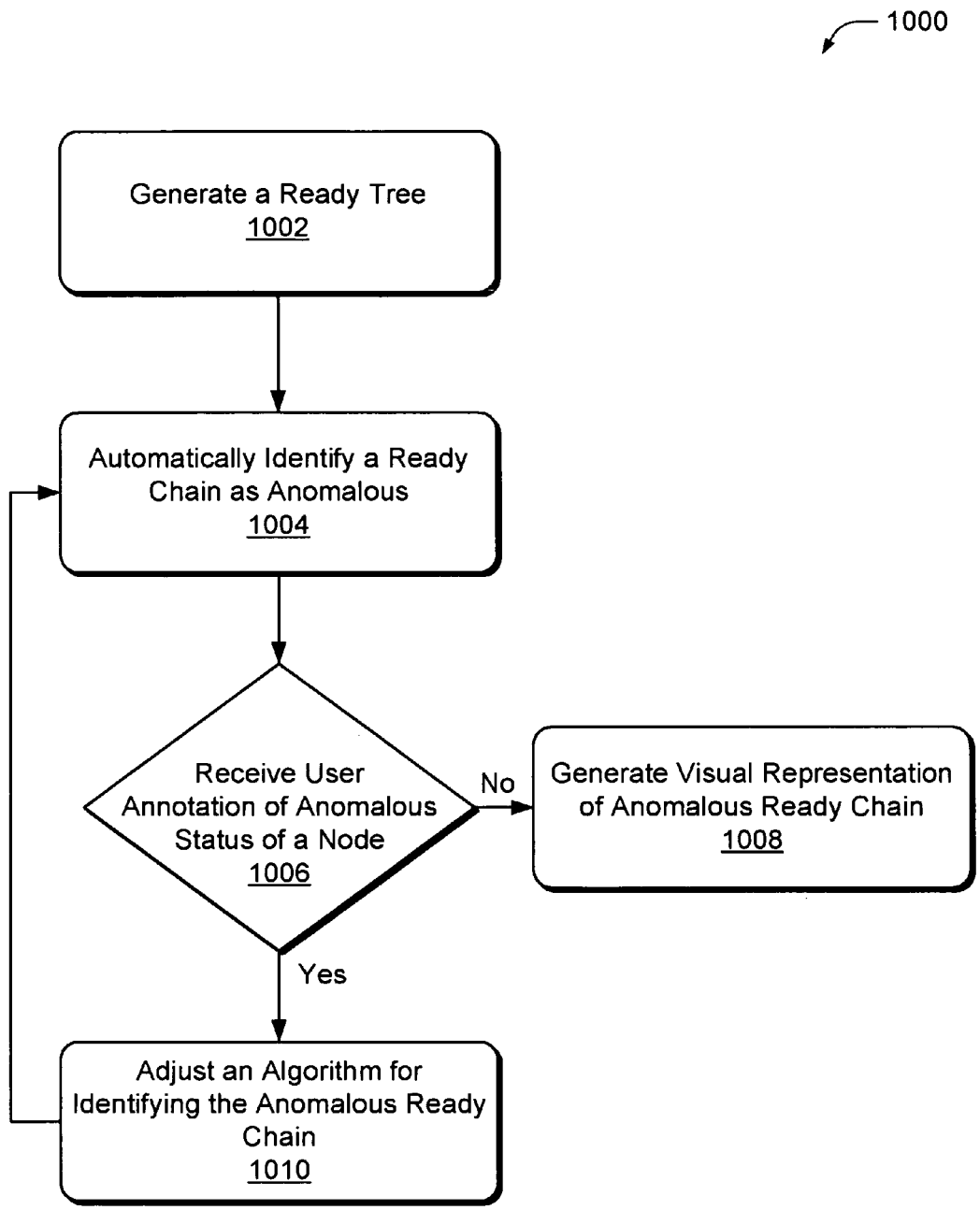
FIG. 10 is a flowchart showing an exemplary method of generating a visual representation of an anomalous ready chain based on user annotations.

FIG. 10 illustrates an exemplary flowchart of a process 1000 for generating a visual representation of an anomalous ready chain based on user annotations. At block 1002 a ready tree is generated. In some implementations, the ready tree generation is similar to the process described in FIG. 9. At block 1004 a ready chain is automatically identified as an anomalous ready chain. The process 1000 of identifying an anomalous ready chain may be similar to processes discussed above in FIG. 5. In some implementations, the ready tree is displayed to the user 102 in an interactive graphical user interface. As discussed above, one way the user 102 may interact with the interactive graphical user interface is by annotation to change the status of a node marked non-anomalous to anomalous or anomalous to non-anomalous.

At block 1006 a user annotation of an anomalous status of a node may be received. If no annotation is received, then the process 1000 proceeds to the "no" branch and generates a visual representation of the anomalous ready chain at block 1008. Prior to receiving user annotation or in the absence of user annotation, the anomalous ready chain displayed in the visual representation of the ready tree may be thought of as a default anomalous ready chain automatically identified by the system. Default identification of the anomalous ready chain may be based on a length of wait periods in the ready chain.

Returning to block 1006, if the user 102 annotates the ready tree by changing an anomalous flag for one of the nodes in the ready tree, then the process 1000 proceeds to the "yes" branch to block 1010. At block 1010 the algorithm for automatically identifying the ready chain in the ready tree as the anomalous ready chain is adjusted, based on the user annotation of the anomalous status of the node. From block 1010, the process 1000 returns to block 1004 to automatically re-identifies a ready chain as the anomalous ready chain. Depending on the adjustment to the algorithm, the anomalous ready chain may or may not change. The adjustment may occur on-the-fly as a user annotates nodes, or annotations may be aggregated and the algorithm adjusted at a later time.

Exemplary Computing Device

Figure 11:
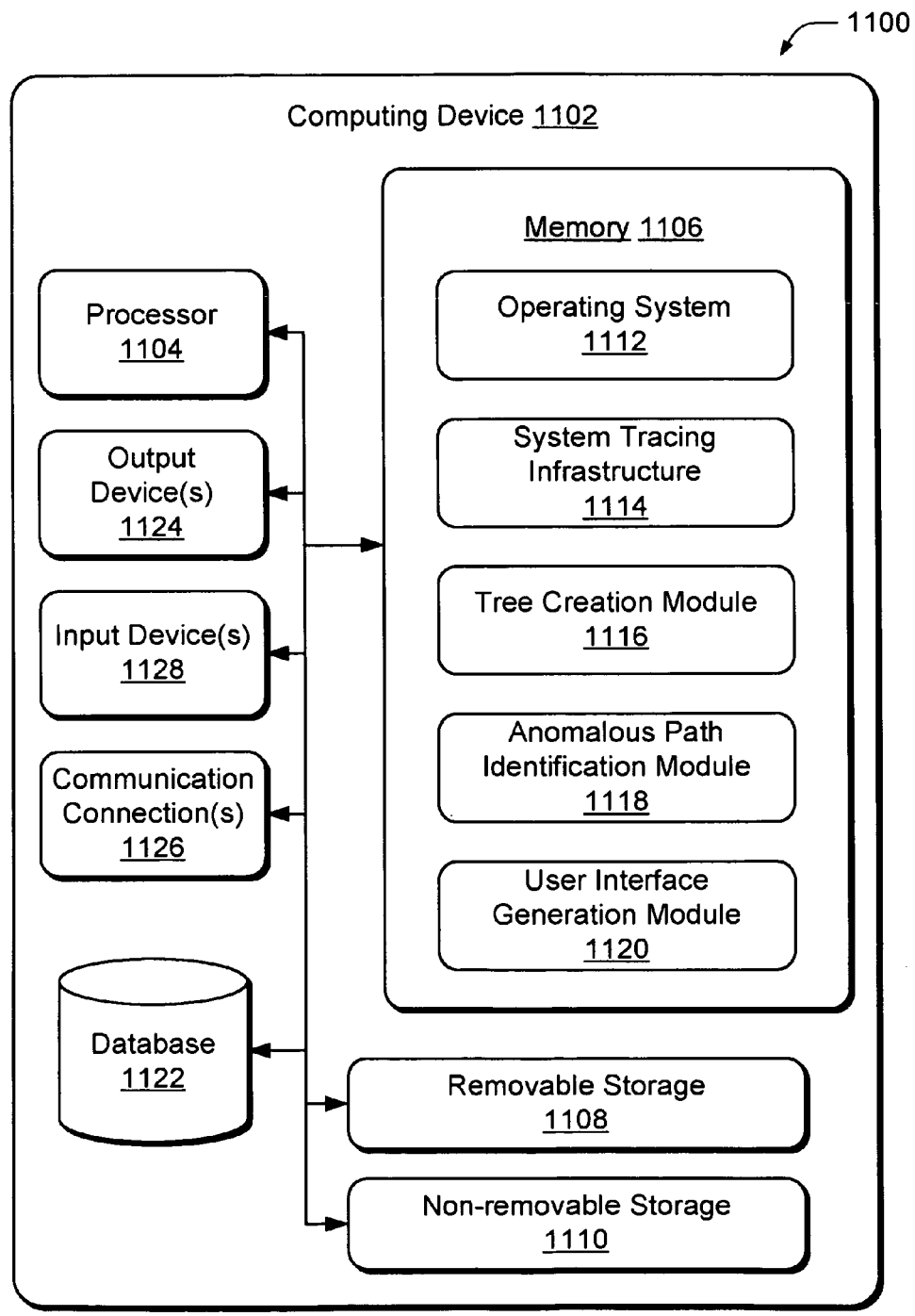
FIG. 11 is a schematic diagram of an exemplary computing device.

FIG. 11 is a block diagram 1100 showing an exemplary computing device 1102 for providing a tool to visualize system tracing infrastructure events. The computing device 1102 may be configured as any suitable system capable of creating a ready tree. The computing device may be the same or different than the computing device 104 or the server 110 shown in FIG. 1 or the computing device 202 shown in FIG. 2. In one exemplary configuration, the computing device 1102 comprises at least one processor 1104 and memory 1106. The processor 1104 may be implemented as appropriate in hardware, software, firmware, or combinations thereof. Software or firmware implementations of the processor 1104 may include computer- or machine-executable instructions written in any suitable programming language to perform the various functions described.

For example, the computing device 1102 illustrates architecture of these components residing on one system or one server that may be communicatively coupled to a network, such as the network 108 shown in FIG. 1. Alternatively, these components may reside in multiple other locations, servers, or systems. For instance, all of the components may exist on a client side. Furthermore, two or more of the illustrated components may combine to form a single component at a single location. The illustrated components may also reside in a computing device without a connection to a network, such as a stand-alone database. The computing device 1102 may in various implementations be similar to either the computing device 104 or the server computer 110 shown in FIG. 1.

Memory 1106 may store programs of instructions that are loadable and executable on the processor of 1104, as well as data generated during the execution of these programs. Depending on the configuration and type of computing device 1102, memory 1106 may be volatile (such as RAM) and/or non-volatile (such as ROM, flash memory, etc.). The computing device 1102 may also include additional removable storage 1108 and/or non-removable storage 1110 including, but not limited to, magnetic storage, optical disks, and/or tape storage. The disk drives and their associated computer-readable media may provide non-volatile storage of computer readable instructions, data structures, program modules, and other data.

Turning to the contents of the memory 1106 in more detail, the memory 1106 may include an Operating System 1112, a System Tracing Infrastructure 1114, a Tree Creation Module 1116, an Anomalous Path Identification Module 1118, and/or a User Interface Generation Module 1120. The memory 1106 may also, in some implementations, include a database 1122.

The system tracing infrastructure 1114 may create a trace of events in the system as discussed above. The Tree Creation Module 1116 may automatically extracts events from the trace related to wait periods of threads. The Tree Creation Module 1116 may further structure the events into a ready tree by identifying a context switch that ends a wait period of a thread of interest. The thread of interest may be designated automatically by the system in response to a performance event or input received from a user 102 may manually designate the thread of interest. The Tree Creation Module 1116 may further identify a parent thread that sends a ready signal to the thread of interest which enables the context switch. The Tree Creation Module 1116 may also identify any wait periods of the parent thread that overlap with the wait period of the thread of interest. Further processes by the Tree Creation Module 1116 may identify an ancestor thread that in turn sends a ready signal to the parent thread enabling a context switch from the ancestor thread to the parent thread. Identification of parent and previous generations of threads by the Tree Creation Module 1116 creates a ready tree with nodes that are run periods or wait periods of the respective threads and the nodes are linked by respective context switches.

In some implementations the Tree Creation Module 1116 may further expand the ready tree by identifying a wait period of the ancestor thread that overlaps with the wait period of the thread of interest and then for the wait period of the ancestor thread identifying a previous ancestor thread that sends a ready signal to the ancestor thread enabling a context switch from the previous ancestor thread to the ancestor thread. In this process may be recursively repeated (i.e., the "previous ancestor" thread becomes the "ancestor" thread and a "previous previous ancestor" thread is identified) until a stop condition is reached.

The Anomalous Path Identification Module 1118 identifies an anomalous path or chain of nodes in the ready tree as discussed above. In some implementations the Anomalous Path Identification Module 1118 may identify an anomalous path automatically. In other implementations the Anomalous Path Identification Module 1118 may identify an anomalous path in response to user annotations of the ready tree.

The User Interface Generation Module 1120 may cause an output device 1124 of the computing device 1102 to display a visual representation of the ready tree. In some implementations, an output device displaying the ready tree may be remote from the computing device 1102. The user interface generated by the User Interface Generation Module 1120 may enable the user 102 to interact with the visual representation of the ready tree.

In some implementations, the User Interface Generation Module 1120 may sequentially highlight anomalous nodes in response to a command from the user 102. Highlighting includes any method of visually distinguishing a highlighted node from a non-highlighted node such as color, shading, size, text style, and position. The command from the user may include a single input such as pressing a "Next" or "Tab" key that shifts the highlighting from one anomalous node to another anomalous node. The highlighting and the ability to toggle between nodes of interest in response to the single input enable the user 102 of the ready tree to efficiently find and analyze system tracing information of interest.

The database 1122 may store data previously collected by the system tracing infrastructure. Some of the data stored in the database 1122 may include historical wait periods for system events. An event may happen multiple times (e.g., request for a lock on a printer driver) and the system tracing infrastructure may record an associated wait time for a thread every time that same event occurs. All of these associate wait times may be stored in the database 1122 and provide a record of historical wait periods for past occurrences of that system event.

Computer-readable media includes volatile and nonvolatile, removable and non-removable media implemented in any method or technology for storage of information such as computer readable instructions, data structures, program modules or other data. Memory 1106, removable storage 1108, and non-removable storage 1110 are all examples of computer-readable media. Additional types of computer readable-media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 1102.

The computing device 1102 may also contain a communication connection(s) 1126 that allows the device to communicate with other devices such as servers and/or user terminals on a network, such as the network 108 of FIG. 1. Communication connection(s) 1126 is an example of a mechanism for receiving and sending communication media. Communication media typically embodies computer readable instructions, data structures, and program modules. By way of example, and not limitation, communication media includes wired media such as a wired network or direct-wired connection, and wireless media such as acoustic, RF, infrared and other wireless media.

The computing device 1102 may also include input device(s) 1128 such as a keyboard, mouse, pen, voice input device, touch input device, stylus, and the like, and output device(s), 1124 such as a display, monitor, speakers, printer, etc. All these devices are well known in the art and need not be discussed at length.

The subject matter described above can be implemented in hardware, software, or in both hardware and software. Although implementations of ready tree generation have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of generating ready trees. For example, the methodological acts need not be performed in the order or combinations described herein, and may be performed in any combination of one or more acts.

The invention claimed is:

1. A method implemented on a computing device by a processor configured to execute instructions that, when executed by the processor, direct the computing device to perform acts comprising:
   receiving a trace of system events from a system tracing infrastructure;
   receiving an indication of a thread of interest;
   automatically analyzing the trace by the processor to identify wait periods of the thread of interest within a time window;
   identifying a longest lock-related wait period from the wait periods of the thread of interest, wherein a lock-related wait period comprise a wait period when a call stack of the thread of interest includes a lock-related call;
   automatically generating a ready tree of thread status by acts comprising:
      identifying a first ready signal from the trace that ends the longest lock-related wait period for the thread of interest by readying the thread of interest to run, wherein the first ready signal identifies a parent thread;
      identifying a lock-related wait period for the parent thread that overlaps with the longest lock-related wait period for the thread of interest, wherein the lock-related wait period for the parent thread comprises a wait period when a call stack of the parent thread includes a lock-related call;
      identifying a second ready signal from the trace that ends the lock-related wait period of the parent thread, wherein the second ready signal identifies an ancestor thread;
      identifying a lock-related wait period for the ancestor thread that overlaps with the longest lock-related wait period for the thread of interest, wherein the lock-related wait period for the ancestor thread comprises a wait period when a call stack of the ancestor thread includes a lock-related call; and
      wherein nodes of the ready tree are run periods or wait periods of the threads and the nodes are linked by respective ready signals; and
   designating a path in the ready tree from the longest lock-related wait period for the thread of interest to a potential root cause of the wait as an anomalous path, wherein the designated path is a path such that an average wait period of the nodes in the designated path is longer than an average wait period of nodes in other paths in the ready tree;
   generating a visual display of the ready tree for display in a user interface, wherein nodes and links in the anomalous path are highlighted; and
   revealing a listing of call stack events for a node in the ready tree in response to receiving an indication of the node.

2. The method of claim 1, wherein the automatically generating the ready tree of thread status includes acts further comprising:
   identifying a previous ready signal from the trace that ends the lock-related wait period of the ancestor thread, wherein the previous ready signal identifies a previous ancestor thread; and
   identifying a lock-related wait period for the previous ancestor thread that overlaps with the longest lock-related wait period for the thread of interest, wherein the lock-related wait period for the previous ancestor thread comprises a wait period when a call stack of the previous ancestor thread includes a lock-related call; and
   recursively repeating until a stop condition is reached.

3. The method of claim 2, wherein the stop condition comprises identification of a not lock-related wait period, reaching a user-specified recursion depth, or reaching a beginning of the trace file.

4. The method of claim 1, wherein the system tracing infrastructure comprises a buffering and logging mechanism implemented in an operating system kernel to trace events raised by user-mode applications and events raised by kernel-mode device drivers.

5. The method of claim 1, wherein the indication of the thread of interest comprises at least one of a user input or a predefined performance event.

6. The method of claim 1, wherein indication of the thread of interest comprises a predefined performance event comprising a wait period that exceeds a time threshold.

7. The method of claim 1, further comprising receiving an annotation of a node on the visual display of the ready tree, wherein the annotation comprises one of:
an input changing a status of a node from anomalous to non-anomalous; or
an input changing a status of a node from non-anomalous to anomalous.

8. The method of claim 1, wherein the lock-related call is recognized by acts comprising:
matching calls in the call stack to a list of calls known to be lock acquire calls or lock release calls.

9. The method of claim 1, wherein the wait periods comprise periods of threads waiting off processor, threads responding to a timer wake up, and threads responding to an asynchronous procedure call.

10. A system comprising:
a processor; and
a memory storing instructions for execution by the processor, the instructions comprising:
a system tracing infrastructure that creates a trace of events in the system;
a tree creation module that automatically extracts events from the trace related to wait periods of threads and structures the events into a ready tree comprising nodes that are run periods or wait periods of threads and links between the nodes that are context switches by acts comprising:
identifying a first context switch that ends a longest wait period of a thread of interest;
identifying a parent thread that sends a first ready signal to the thread of interest enabling the context switch;
identifying a wait period of the parent thread that overlaps with the longest wait period of the thread of interest; and
for the wait period of the parent thread, identifying an ancestor thread that sends a second ready signal to the parent thread enabling a second context switch from the ancestor thread to the parent thread;
an anomalous path identification module that designates a path in the ready tree from the longest wait period of the thread of interest to a potential root cause of the wait as an anomalous path, wherein the designated path is a path such that an average wait period of the nodes in the designated path is longer than an average wait period of nodes in other paths in the ready tree; and
a user interface generation module for generating a visual display of the ready tree.

11. The system of claim 10, wherein the tree creation module that automatically extracts events from the trace related to wait periods of threads and structures the events into the ready tree performs acts further comprising:
identifying a wait period of the ancestor thread that overlaps with the longest wait period of the thread of interest;
for the wait period of the ancestor thread, identifying a previous ancestor thread that sends a previous ready signal to the ancestor thread enabling a previous context switch from the previous ancestor thread to the ancestor thread; and
recursively repeating until a stop condition is reached.

12. The system of claim 10, wherein the user interface generation module configures a user interface usable to perform acts comprising:
identifying nodes in the ready tree that are associated with a call stack event comprising a search term input by a user; and
sequentially highlighting anomalous nodes in response to a command from a user.

13. The system of claim 10, wherein a cause of the longest wait period comprises a lock contention.

14. The system of claim 10, wherein the user interface generation module configures a user interface usable to reveal a listing of call stack events for a node in the ready tree in response to receiving an indication of the node from a user.

15. One or more computer-readable hardware devices media-encoded with instructions that, when executed by a processor of a device, cause the processor to perform acts comprising:
automatically generating a ready tree of thread status from a trace of system events by the processor, wherein nodes of the ready tree are wait periods or run periods of threads and ready signals sent from a running thread to a waiting thread link the nodes;
automatically identifying a ready chain in the ready tree as an anomalous ready chain based on a length of wait periods, wherein the ready chain comprises a plurality of linked nodes, wherein a wait period that falls below a probability threshold as identified by a probabilistic model comprising being identified as an anomalous wait period, the probabilistic model selected from a set of probabilistic models based on goodness of fit of the probabilistic model to a histogram of historical wait periods as
determined by a non-parametric test for goodness of fit; and
presenting an interactive graphical user interface to display the ready tree and receive annotations to the ready tree.

16. The one or more computer-readable hardware devices of claim 15, wherein the ready chain identified as the anomalous ready chain comprises a ready chain with at least one of:
a longest average wait period;
a longest median wait period;
a longest total wait period;
a greatest number of nodes;
a greatest number of anomalous wait periods; or
a wait period in a predetermined quantile of wait times.

17. The one or more computer-readable hardware devices of claim 15, wherein the probabilistic model is constructed by acts comprising:
identifying an event that caused an end of the wait period;
constructing a histogram of historical wait periods for a same event, the historical weight periods extracted from past traces; and
comparing the wait period to the historical wait times.

18. The one or more computer-readable hardware devices of claim 15, wherein the instructions cause the device to perform acts further comprising:
visual displaying nodes in the anomalous ready chain differently than other nodes in the ready tree;
receiving a user annotation of an anomalous status of a node, wherein the user annotation of the anomalous status of the node comprises:
a user annotation of a node automatically marked non-anomalous as anomalous; and a user annotation of a node automatically marked anomalous as non-anomalous.

19. The one or more computer-readable hardware devices of claim 18, wherein an algorithm for the automatically identifying the ready chain in the ready tree as the anomalous ready chain is adjusted based factors comprising the user annotation of the anomalous status of the node.

20. The one or more computer-readable hardware devices of claim 15, wherein the wait periods comprise periods of threads waiting off processor, threads responding to a timer wake up, and threads responding to an asynchronous procedure call.

\* \* \* \* \*